United States Patent Office 2,944,343
Patented July 12, 1960

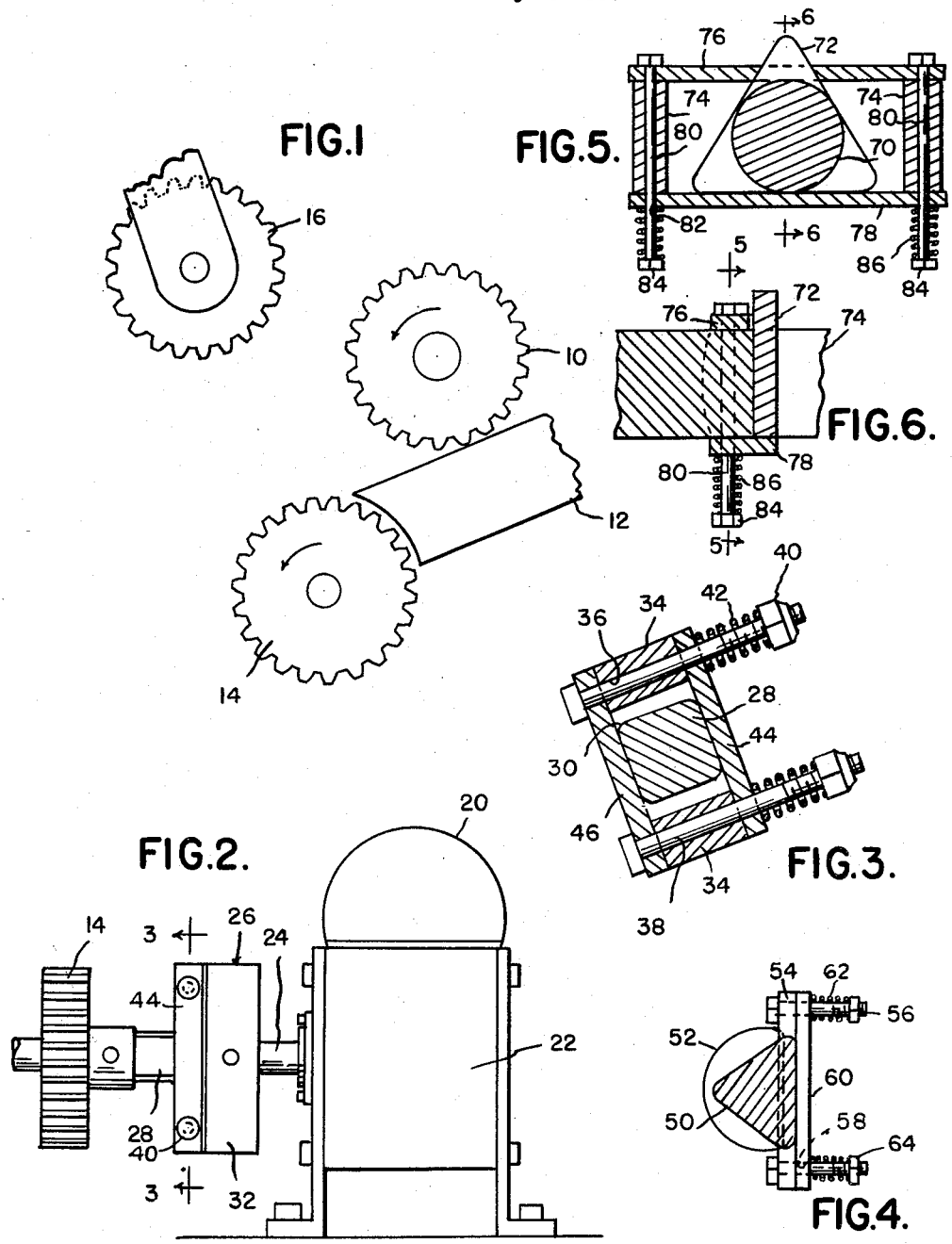

2,944,343

DRIVE MEANS INCLUDING A SLIP CLUTCH

Russel W. Anthony, Detroit, Mich., assignor to National Broach & Machine Company, Detroit, Mich., a corporation of Michigan Filed May 9, 1955, Ser. No. 506,947

6 Claims. (Cl. 33—179.5)

The present invention relates to drive means including a slip clutch.

The present invention comprises a drive means including a slip clutch adapted to transmit a predetermined torque but to slip when the required torque is exceeded. When the torque is exceeded the clutch is designed to effect a reverse driving action on the driven member of short duration, which is useful for example in establishing meshing contact between a pair of gears, one of which is connected to the driven member.

It is an object of the present invention to provide slip clutch mechanism to facilitate meshing engagement between a driven gear and a second gear brought into peripheral contact therewith.

More specifically, it is an object of the present invention to provide apparatus as described in the preceding paragraph in which the slip clutch mechanism includes a non-circular shaft, resiliently biased pressure members engaging the non-circular portion of the driven shaft at opposite sides thereof and effective to transmit a predetermined torque but to expand and permit slippage when the torque is exceeded, and at the same time to establish a short duration torque impulse in the opposite direction to the driven shaft.

Other objects and features of the invention will become apparent as the description proceeds, especially when taken in conjunction with the accompanying drawings, wherein:

Figure 1 is a diagrammatic view showing an arrangement of parts in which the slip clutch is useful.

Figure 2 is a fragmentary elevational view of gear drive mechanism including the slip clutch.

Figure 3 is a section on the line 3—3, Figure 2.

Figure 4 is a partially schematic view illustrating a simplified form of the present invention.

Figure 5 is a fragmentary section on the line 5—5, Figure 6.

Figure 6 is a section on the line 6—6, Figure 5 of yet another embodiment of the present invention.

In Figure 1 there is shown an arrangement of master gears or gauging gears adapted to pre-gauge a work gear 10 before it enters into a machine. The machine may for example be a gear shaving machine in which injury to certain parts would result if an oversized gear were fed thereto. Alternatively, the machine may be a gauging machine for effecting accurate gauging of certain characteristics of the work gear 10.

In any case, the work gear 10 is illustrated as adapted to be advanced by gravity down a chute indicated diagrammatically at 12 into contact with a rotating master gear 14 which is being driven by suitable means in the direction of the arrow shown in the figure. Opposite the rotating master gear 14 is a second master gear 16 which may be fixed or rotatable as the case may be.

It will be understood that the axes of the gears 14 and 16 are spaced apart a distance such that if the gear 10 is oversized it cannot pass between the gears 14 and 16 without displacing one of the gears. Displacement of a gear may be a signal to suitable mechanism for automatically preventing entrance of the work gear 10 into the operating part of the machine.

In some cases it will be appreciated that the work gear 10, instead of entering freely into mesh with the gears 14 and 16, and particularly the continuously rotating gear 14, will engage the gear 14 with the tops of teeth in contact and so will present a locking condition when the gear effects simultaneous engagement with the master gears 14 and 16. In order to permit slippage so as to prevent damage to the parts, and also in order to provide a mechanism which will tend to disturb the non-meshing relationship, the slip clutch illustrated in details in Figures 2 and 3 is provided.

Referring first to Figure 2, there is shown diagrammatically a motor 20 operatively connected to a gear box 22 having an output shaft 24 connected to the slip clutch indicated generally at 26. The master gear 14 has connected thereto a short non-circular shaft section 28 which forms a part of the slip clutch.

Referring now to Figure 3, the non-circular shaft section 28 is illustrated as square, which is its preferred form, but it may if desired have other configurations. Preferably however, it is polygonal and better action in establishing reverse torque is obtained when it is polygonal and provided with an even number of sides such as hexagonal, octagonal, etc.

The square cross-sectional shape is slightly modified by rounding the corners, as indicated at 30. The slip clutch includes a block 32 having laterally spaced ears 34, the spacing between the ears being such as to permit rotation therebetween of the non-circular shaft section 28, as clearly indicated in Figure 3. The ears 34 are provided with elongated openings therethrough indicated at 36 which receive the elongated bolts 38. The bolts 38 are provided with nuts 40 and compression springs 42 intermediate the nuts 40 and a movable side plate 44. A similar side plate 46 is provided at the opposite side of the ears 34. The plates 44 and 46 are apertured to receive the bolts 38 and are urged by the springs 42 into abutting relationship with opposite parallel flat sides of the square shaft section 28. Obviously, sufficient torque exerted between the block 32 and the square shaft section 28 will result in a camming action of the square shaft section 28, forcing the plates 44 and 46 apart. This interrupts the driving relationship between the shaft 24 and the shaft section 28 and prevents damage to the driven members.

More important however, it will be appreciated that after slightly more than 45 degrees' rotation of the block 32 relative to the square shaft section 28, the springs 42, urging the plates 44 and 46 together, exert a reverse torque on the short shaft section 28. This, in the present case will have the effect of reversing the direction of pressure between the teeth of the master gear 14 and the work gear 10. Some additional rotation will again bring the parts into the relationship illustrated in Figure 3, which will again establish a forward driving torque in the direction required to cause the gear 10 to roll through the space between the master gears 14 and 16.

Referring now to Figure 4, the present invention may be carried out employing a single yieldable element in association with the flat side of a polygonal driving element. In this case a polygonal driving element 50, herein illustrated as generally triangular in shape, is located at one end of a shaft. A second shaft, a portion of which is illustrated at 52, is coupled in releasable driving relationship to the shaft carrying the triangular member 50. To accomplish the driving connection the shaft 52 has fixedly secured thereto a plate 54 having a pair of pins 56 extending through openings 58 in a yieldable plate 60. The plate 60 is engaged by springs 62 carried by the pins 56 and retained thereon by spring stops 64. So long as the predetermined load is not exceeded, the springs retain the yieldable plate 60 against the flat side of the driving element 50. As soon as the load is exceeded however, the driving element 50 operates as a cam to move the plate 60 away from the plate 54. In this case, as in the previously described embodiment of the invention, the mechanical advantage of the camming structure increases upon initial yielding movement so that once movement of the plate 60 (or separation of the plates 44 and 46 in the previously described embodiment of the invention) is initiated, the movement or separation continues rapidly to full release position.

Referring now to Figures 5 and 6 there is illustrated an arrangement in which a shaft 70 of circular cross-section is provided at its end with a polygonal driving plate such for example as the triangular driving plate 72. In this case the second shaft to be coupled to the shaft 70 is provided with a pair of axially extending ears 74 adapted to straddle the end of the shaft 70. The ears 74 carry a relatively narrow stationary plate 76 adapted to engage a circular portion of the shaft 70 and a relatively wide movable plate 78 adapted to engage one of the straight sided surfaces of the polygonal driving element or plate 72. The fixed plate 76 carries pins 80 extending through openings 82 in the movable plate 78, the pins having heads as indicated at 84 to retain compression springs 86 thereon adapted to press the plate 78 against the driving element 72.

The foregoing embodiment of the invention is similar to that described in Figure 4 in that a single plate is moved by the polygonal camming and driving element, but is also similar to the embodiment illustrated in Figure 3 in that means are provided for engaging opposite sides of the shaft and polygonal driving element to produce a balanced construction.

The mechanism just described thus is effective to produce continuous rotation of the driven part so long as a predetermined torque is not exceeded. If the torque is exceeded the slip clutch arrangement permits slippage between the driving means and driven shaft and this slippage is accompanied by alternate forward and reverse application of torque which will have the effect of tending to loosen or disrupt a blockage existing for the driven shaft. In the particular embodiment of the present invention this blockage results from failure of a gear carried by the driven shaft to mesh with a work gear brought into peripheral contact therewith.

The drawings and the foregoing specification constitute a description of the improved drive means including a slip clutch in such full, clear, concise and exact terms as to enable any person skilled in the art to practice the invention, the scope of which is indicated by the appended claims.

What I claim as my invention is:

1. Gear checking apparatus comprising a pair of master gears spaced laterally to provide a space therebetween for passage of a gear being checked with its teeth meshed with the teeth of said master gears, drive means for rotating one of said master gears, means for advancing gears to be checked toward the space between said master gears and into contact with the driven one of said master gears, said drive means comprising a first shaft, means rotating said shaft in a first direction, a second shaft substantially coaxial with said first shaft and connected to one of said master gears, coupling means between said shafts arranged to transmit torque from said first shaft to said second shaft in the said first direction of rotation up to a predetermined torque and operable when said torque is exceeded to apply brief reverse torque to said second shaft to induce meshing between said gear being checked and said master gears if the increase in torque was due to jamming caused by failure to mesh.

2. Gear checking apparatus as defined in claim 1, in which said coupling means comprises cam means in the form of an equilateral triangle having rounded corners secured to the end of one of said shafts, a first plate element carried by the other of said shafts in position to engage said cam means, means mounting said plate for movement toward and away from said cam means radially of said shafts, and resilient means urging said plate toward said cam means.

3. Gear checking apparatus as defined in claim 2, comprising a second plate element carried by said second shaft in position to engage a circular portion of said first shaft spaced axially of said cam means and opposite to said first plate to balance radial forces acting between said cam means and said first plate element.

4. Gear treating apparatus comprising a gear-like member with which a work gear is required to mesh, means for advancing a work gear into peripheral engagement with said member, drive means for said member, coupling means between said member and said drive means comprising a pair of generally coaxial shafts connected respectively to said member and said drive means, a polygonal cam fixed to one of said shafts, a pressure plate carried by the other of said shafts for rotation therewith, for engagement with said cam and for movement radially of its shaft, and resilient means urging said plate radially of said shaft into engagement with said cam to transmit torque up to a value determined by said resilient means and then to transmit forward and reverse torque impulses to said gear member until said work gear enters into mesh.

5. Apparatus as defined in claim 4, in which said polygonal cam is triangular.

6. Apparatus as defined in claim 5, in which said other shaft has a second plate disposed to engage said first shaft at a point spaced axially from said cam and diametrically opposite said pressure plate.

References Cited in the file of this patent

UNITED STATES PATENTS

| | | |
|---|---|---|
| 1,861,186 | Littell et al. | May 31, 1932 |
| 1,959,213 | Nygard | May 15, 1934 |
| 1,962,993 | Leece | June 12, 1934 |
| 2,602,473 | Dalle | July 8, 1952 |
| 2,688,857 | Jones | Sept. 14, 1954 |
| 2,692,486 | Anderson | Oct. 26, 1954 |
| 2,794,551 | Colling et al. | June 4, 1957 |
| 2,803,342 | Gates | Aug. 20, 1957 |
| 2,826,903 | Gerslung et al. | Mar. 18, 1958 |

FOREIGN PATENTS

| | | |
|---|---|---|
| 749,550 | France | May 8, 1933 |